(12) United States Patent
Sun et al.

(10) Patent No.: US 12,309,777 B2
(45) Date of Patent: May 20, 2025

(54) APPLYING TCI STATE CHANGES TO MULTIPLE CORESETS

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 742 days.

(21) Appl. No.: 17/593,405

(22) PCT Filed: Aug. 5, 2020

(86) PCT No.: PCT/CN2020/106963
§ 371 (c)(1),
(2) Date: Sep. 17, 2021

(87) PCT Pub. No.: WO2022/027275
PCT Pub. Date: Feb. 10, 2022

(65) Prior Publication Data
US 2022/0312458 A1    Sep. 29, 2022

(51) Int. Cl.
*H04W 72/20*  (2023.01)
*H04L 5/00*   (2006.01)
*H04W 8/22*   (2009.01)

(52) U.S. Cl.
CPC .......... *H04W 72/20* (2023.01); *H04L 5/0053* (2013.01); *H04W 8/22* (2013.01)

(58) Field of Classification Search
USPC ................ 370/229, 230, 252, 328, 329, 330
See application file for complete search history.

(56) References Cited

U.S. PATENT DOCUMENTS

2019/0373450 A1   12/2019   Zhou et al.
2020/0100223 A1   3/2020    Park et al.
(Continued)

FOREIGN PATENT DOCUMENTS

CN    110 034 874    7/2019
CN    110 798 894    2/2020
(Continued)

OTHER PUBLICATIONS

Oppo, "MAC CE design for eMIMO"; 3GPP TSG-RAN WG2 Meeting #108; R2-1915158; Nov. 22, 2019; 6 sheets.
(Continued)

*Primary Examiner* — Nguyen H Ngo
(74) *Attorney, Agent, or Firm* — Fay Kaplun & Marcin, LLP

(57) ABSTRACT

A user equipment (UE) configured to perform a transmission configuration indicator (TCI) state change for more than one control resource set (CORESET). The UE has one or more processors configured to receive, from a base station, an identification of a group of control resource sets (CORESETs), the CORESET group including a plurality of CORESETs, receive, from the base station, an indication, via a medium access control (MAC) control element (CE), of a transmission configuration indicator (TCI) state change for one or more of the plurality of CORESETs in the CORESET group and apply the TCI state change for the one or more of the plurality of CORESETs in the CORESET group based on, at least, the indication.

20 Claims, 8 Drawing Sheets

(56) References Cited

U.S. PATENT DOCUMENTS

| | | | |
|---|---|---|---|
| 2020/0154380 A1 | 5/2020 | Zhou et al. | |
| 2020/0229161 A1 | 7/2020 | Raghavan et al. | |
| 2021/0105759 A1 | 4/2021 | Bai et al. | |
| 2021/0144744 A1* | 5/2021 | Zhou | H04W 72/23 |
| 2021/0337525 A1* | 10/2021 | Rahman | H04L 5/0094 |
| 2022/0077969 A1* | 3/2022 | Kim | H04L 1/1861 |
| 2022/0278787 A1* | 9/2022 | Liu | H04W 72/51 |
| 2022/0304011 A1* | 9/2022 | Zhang | H04L 5/0053 |
| 2023/0156485 A1* | 5/2023 | Zhang | H04W 16/28 370/329 |
| 2023/0216565 A1* | 7/2023 | Kwak | H04B 7/0695 375/267 |

FOREIGN PATENT DOCUMENTS

| | | |
|---|---|---|
| CN | 110959304 | 4/2020 |
| CN | 111327411 | 6/2020 |
| WO | 2020/086983 | 4/2020 |
| WO | 2020/089513 | 5/2020 |
| WO | 2020/122687 | 6/2020 |
| WO | 2020/141014 | 7/2020 |

OTHER PUBLICATIONS

Zte, "On multi-PDCCH design for multi-TRP"; 3GPP TSG RAN WG1 #97; R1-1906242; May 17, 2019; 4 sheets.

NTT Docomo, Inc .; "Discussion on multi-beam enhancement"; 3GPP TSG RAN WG1 #98bis; Oct. 20, 2019; 20 sheets.

Fraunhofer IIS, et al., "Enhancements on multi-TRP/panel transmission", 3GPP TSG RAN WG1 Meeting #97, R1-1907054, May 13, 2019, 5 sheets.

Vivo, "Discussion on beam measurement, beam reporting and beam indication", 3GPP TSG RAN WG1 Meeting #90bis, R1-1717472, Oct. 3, 2017, 12 sheets.

* cited by examiner

| C0 | C1 | C2 | C3 | C4 | C5 | C6 | C7 |
| --- | --- | --- | --- | --- | --- | --- | --- |
| C8 | C9 | C10 | C11 | C12 | C13 | C14 | C15 |
| C16 | C17 | C18 | C19 | C20 | C21 | C22 | C23 |
| C24 | C25 | C26 | C27 | C28 | C29 | C30 | C31 |

760

762

| CORESET Pool ID | Serving Cell ID 764 | | | BWP ID 766 | | |
|---|---|---|---|---|---|---|
| C0 774 | C1 772 | R | R | CORESET ID 770 | | |
| R | TCI State ID | | | | | |
| $T_7$ | $T_6$ | $T_5$ | $T_4$ | $T_3$ | $T_2$ | $T_1$ | $T_0$ |
| $T_{15}$ | $T_{14}$ | $T_{13}$ | $T_{12}$ | $T_{11}$ | $T_{10}$ | $T_9$ | $T_8$ |

758

. . .

| $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8}$ |

Fig. 7c

APPLYING TCI STATE CHANGES TO MULTIPLE CORESETS

BACKGROUND INFORMATION

A transmission configuration indicator (TCI) state contains parameters for configuring a quasi co-location (QCL) relationship between one or more downlink (DL) reference signals (DLRS) and corresponding antenna ports. A TCI state change may be implemented by a network and indicated to a user equipment (UE) in the network to aid in channel estimation.

SUMMARY

Some exemplary embodiments are related to a user equipment (UE) having one or more processors and a transceiver communicatively connected to the one or more processors. The one or more processors are configured to receive, from a base station, an identification of a group of control resource sets (CORESETs), the CORESET group including a plurality of CORESETs, receive, from the base station, an indication, via a medium access control (MAC) control element (CE), of a transmission configuration indicator (TCI) state change for one or more of the plurality of CORESETs in the CORESET group and apply the TCI state change for the one or more of the plurality of CORESETs in the CORESET group based on, at least, the indication.

Other exemplary embodiments are related to a user equipment (UE) having one or more processors and a transceiver communicatively connected to the one or more processors. The one or more processors are configured to receive a configuration from a network for a list of component carriers (CCs) having common beam management (CBM), receive an indication from the network, via a medium access control (MAC) control element (CE), either a transmission configuration indicator (TCI) state change for a physical downlink shared channel (PDSCH) or a control resource set (CORESET) beam change for a physical downlink control channel (PDCCH), the MAC CE comprising an indicator for a CC and apply the TCI state change for the PDSCH or the CORESET beam change for the PDCCH to each of the CCs in the CC list that includes the indicated CC.

Still further exemplary embodiments are related to a user equipment (UE) having one or more processors and a transceiver communicatively connected to the one or more processors. The one or more processors are configured to receive, from a base station, configuration information indicating whether a simultaneous transmission configuration indicator (TCI) state change for a physical downlink control channel (PDCCH) and a physical downlink shared channel (PDSCH) via either one of a PDCCH medium access control (MAC) control element (CE) or a PDSCH MAC CE and apply the (TCI) state change for one or both of the PDCCH and the PDSCH based on, at least, the configuration information.

BRIEF DESCRIPTION OF THE DRAWINGS

FIG. 7c shows a modified PDSCH MAC CE for TCI activation according to various exemplary embodiments.

DETAILED DESCRIPTION

Figure 1:
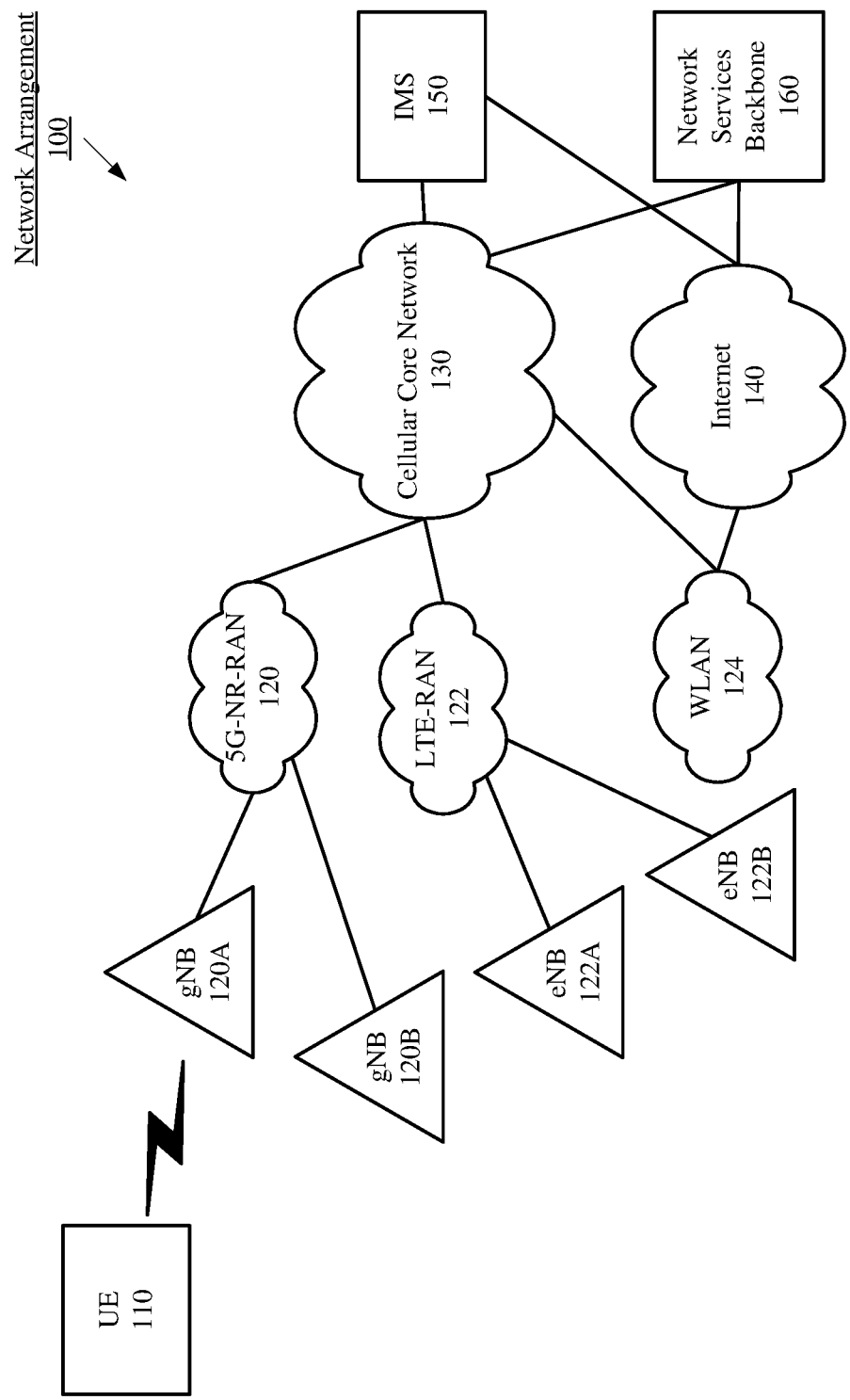
FIG. 1 shows a network arrangement according to various exemplary embodiments.

The exemplary embodiments may be further understood with reference to the following description and the related appended drawings, wherein like elements are provided with the same reference numerals. The exemplary embodiments describe methods for configuring a transmission configuration indicator (TCI) state across multiple control resource sets (CORESETs) of a physical downlink control channel (PDCCH), multiple component carriers (CCs), and/or across both the PDCCH and a physical downlink shared channel (PDSCH). The exemplary embodiments described herein relate to grouping the aforementioned CORESETs, CCs or downlink channels so that a TCI state change is applied to each of those in a particular group.

Network/Devices

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
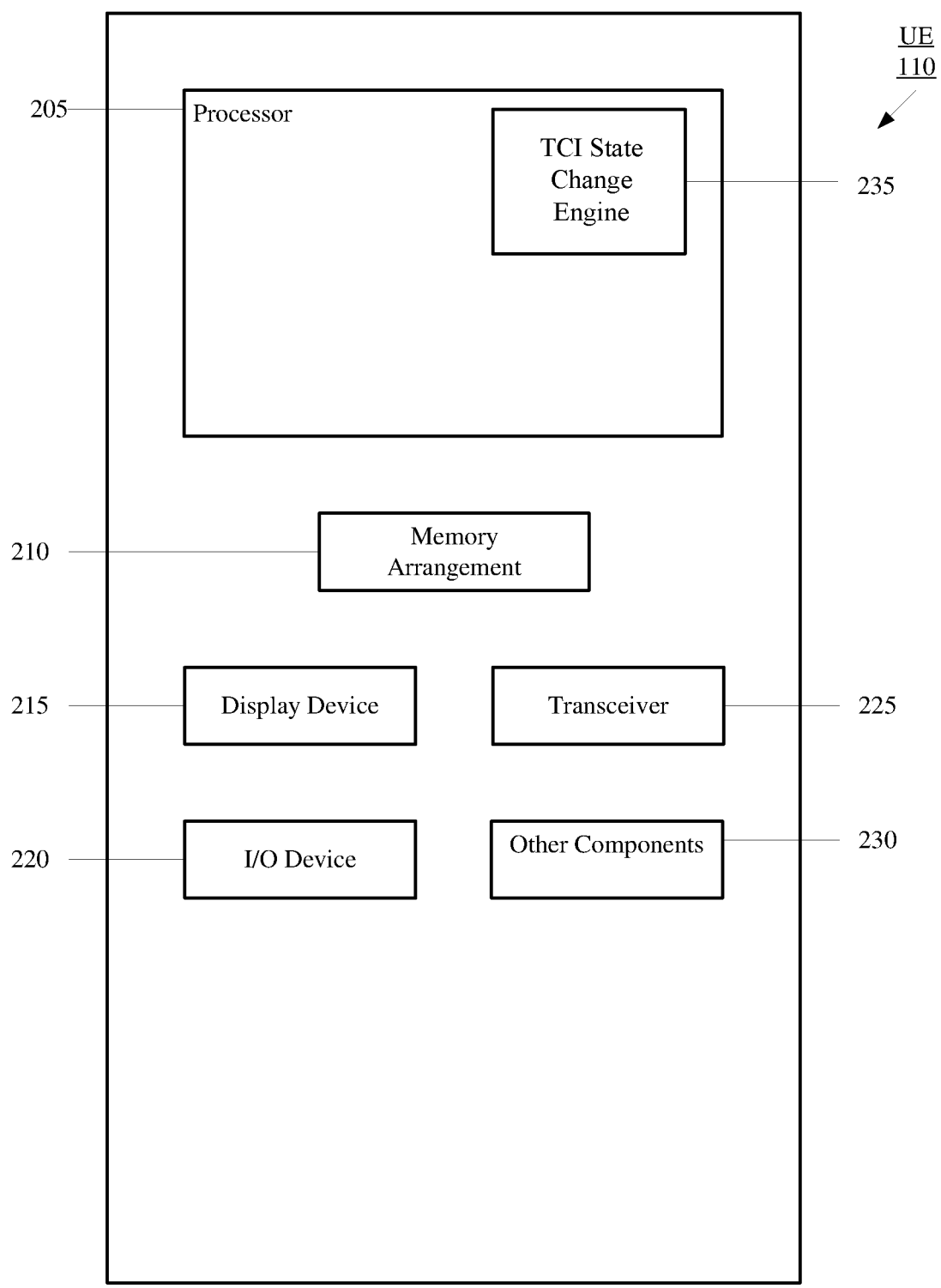
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a TCI state change engine 235. The TCI state change engine 235 may perform operations including applying a TCI state change indicated by the network. In one embodiment, the TCI state change engine 235 may provide a group of component carriers (CCs) subject to common beam management (CBM) to the network so that, when a TCI state change is indicated by the network for one of the CCs, the TCI state change may be applied to each CC in the group.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
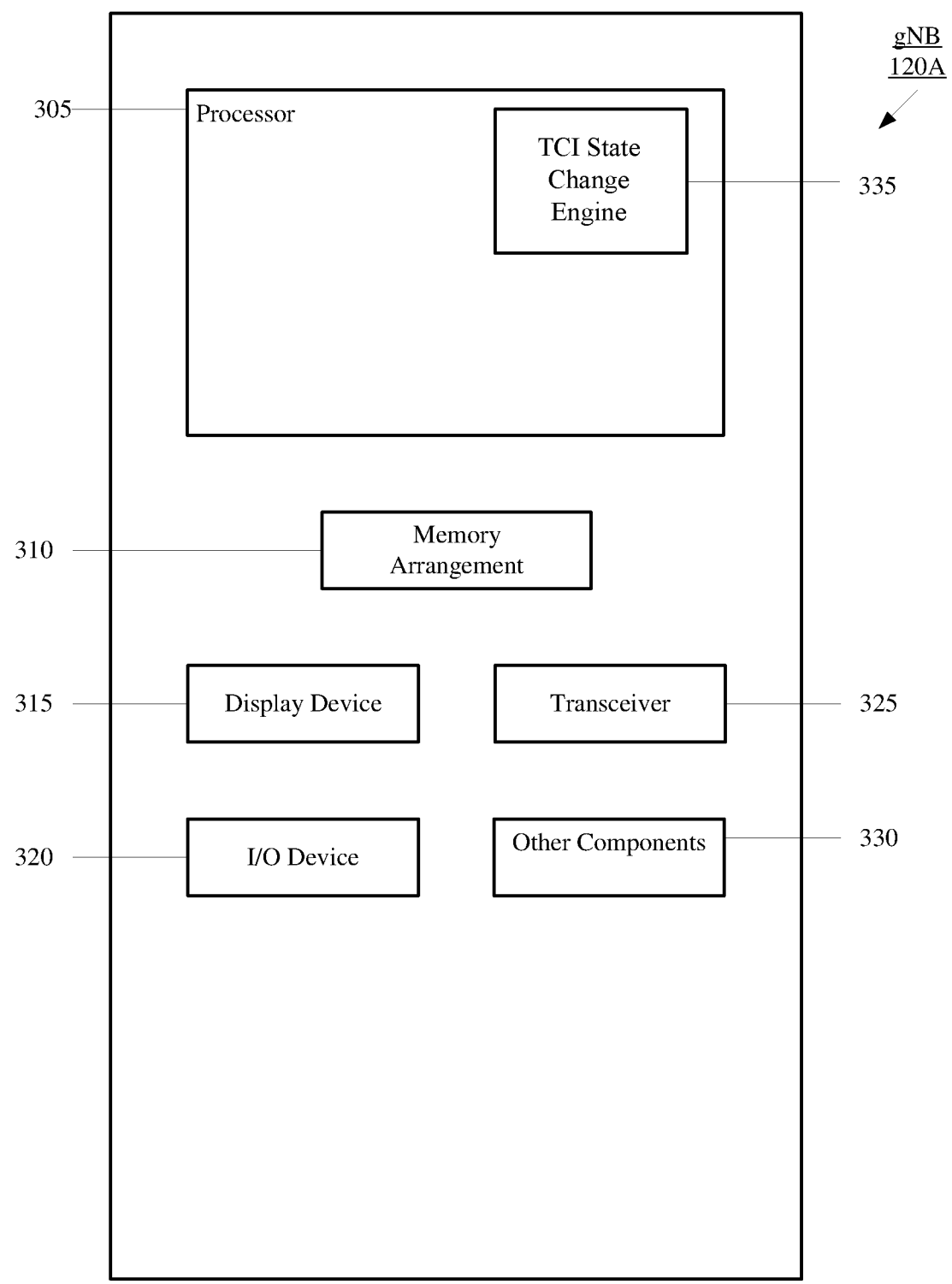
FIG. 3 shows an exemplary network cell according to various exemplary embodiments.

FIG. 3 shows an exemplary network cell, in this example gNB 120A, according to various exemplary embodiments. As noted above with regard to the UE 110, the gNB 120A may represent a serving cell for the UE 110. The gNB 120A may represent any access node of the 5G NR network through which the UEs 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a TCI state change engine 335. The TCI state change engine 335 may perform operations including indicating TCI state changes to a UE, to be described in detail below. The TCI state change engine 335 may also perform operations including configuring CORESET groups and configuring CC lists to which a single TCI change may be applied.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

Single MAC-CE Configures Multiple CORESET IDs

A transmission configuration indicator (TCI) state contains parameters for configuring a quasi co-location (QCL) relationship between one or more downlink (DL) reference signals (DLRS) and corresponding antenna ports, e.g. the demodulation reference signal (DMRS) ports of the physical downlink shared channel (PDSCH), the DMRS port of the physical downlink control channel (PDCCH), or the channel state indicator reference signal (CSI-RS) port(s) of a CSI-RS resource set. Two quasi co-located signals experience very similar channel conditions, such that determining the channel properties of one of the signals will substantially aid the channel estimation of the other signal. A user equipment (UE) may be configured with a list of up to M TCI state configurations within the higher layer parameters for decoding the PDSCH according to a detected PDCCH with downlink control information (DCI) for the UE and a given serving cell, where M depends on the capability of the UE. The TCI states may be transmitted to the UE from the network in a medium access layer (MAC) control element (CE), a DCI message, or a radio resource control (RRC) activation command.

As defined in NR, a control resource set (CORESET) is a set of resource element groups (REG) (each REG comprising a resource block in the frequency domain and one OFDM symbol in the time domain) within which the UE attempts to blindly decode downlink control information (DCI) from the PDCCH. The CORESET may be considered a set of physical resources, e.g., a specific area on NR Downlink Resource Grid) and a set of parameters that is used to carry PDCCH/DCI.

In Rel-15, a DL TCI is configured in the following manner. For the PDCCH, the DL TCI is configured per CORESET via a MAC-CE. For example, one CORESET is configured per MAC-CE. Up to 16 CORESETs may be configured for the PDCCH, although the actual number is often much less. For the PDSCH, the RRC may configure up to 64 TCI states.

In Rel-16, the DL TCI configuration is enhanced. One MAC CE may be used to update a PDSCH TCI state list for one indicated BWP in multiple component carriers (CCs). One MAC CE may also be used to update the TCI for a CORESET (PDCCH) having a same ID for a list of CCs. The CC list is configured by higher layer signaling, and up to 2 CC lists can be configured. The CC lists should be orthogonal (e.g., one CC cannot belong to multiple CC lists).

In the exemplary embodiments, further enhancements are made to improve the DL TCI configuration. In some exemplary embodiments, a single MAC-CE configures a TCI state change for each of multiple CORESET IDs included in a CORESET group. In other exemplary embodiments, component carriers (CCs) subject to Common Beam Management (CBM) handling are grouped so that a TCI state change or a CORESET beam change indicated by the network are applied to each CC of the group. In still other exemplary embodiments, a single MAC-CE configures a TCI state change for both the PDSCH and the PDCCH.

Figure 4A:
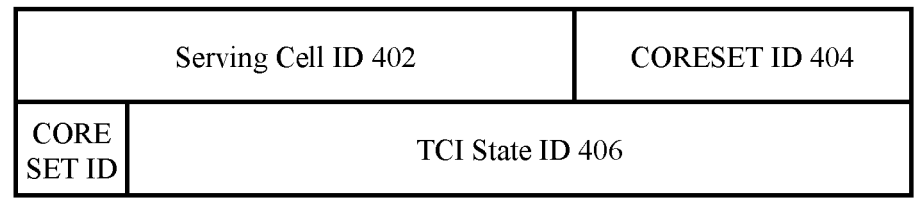
FIG. 4a shows a medium access layer control element (MAC-CE) for configuring a physical downlink control channel (PDCCH) transmission configuration indicator (TCI) according to various exemplary embodiments.

FIG. 4a shows a medium access layer control element (MAC-CE) 400 for configuring a physical downlink control channel (PDCCH) transmission configuration indicator (TCI). The PDCCH MAC-CE 400 includes a field 402 for indicating a serving cell ID (5 bits), a field 404 for indicating a control resource set (CORESET) ID (4 bits), and a field 406 for indicating a TCI state ID (7 bits).

The PDCCH MAC-CE 400 is currently used to configure a beam of a single CORESET. Within a single component carrier (CC), up to 16 different CORESETs may be configured via MAC-CE (each CORESET being configured by a separate MAC-CE), however, the typical number of configured CORESETs is often less. Overhead and latency may be reduced by grouping CORESETs and indicating a TCI state change to the group.

Figure 5:
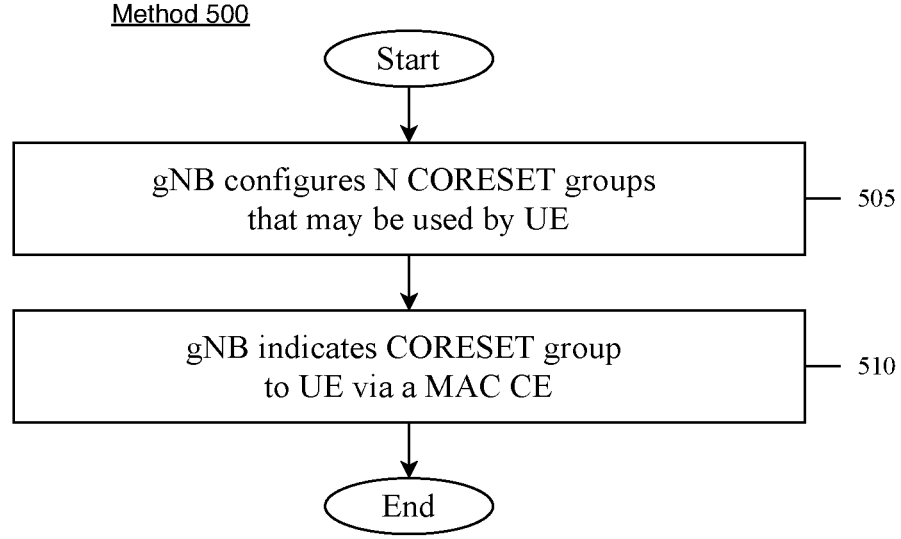
FIG. 5 shows a method for configuring a TCI state for a CORESET group using a single PDCCH MAC CE according to a according to various exemplary embodiments.

FIG. 5 shows a method 500 for configuring a TCI state for a CORESET group using a single PDCCH MAC CE according to various exemplary embodiments. The existing MAC CE 400 may be used to configure the CORESET group, or a modified MAC CE 450, to be described in detail below, may be used.

In 505, a gNB configures N CORESET groups that may be used by the UE. The CORESETs within a group may be chosen based on a transmission and reception point (TRP) using the CORESETs or may be chosen based on other considerations. The number of groups (N) may be 2, 4, or another number. In some exemplary embodiments, the CORESET group may be configured explicitly by RRC signaling. In other exemplary embodiments, a Rel-16 CORESETPoolIndex configuration may be used. Each CORESET group may be configured with a same number of CORESET IDs, or the number of CORESET IDs may differ across CORESET groups. A CORESET ID may belong to multiple CORESET groups, or each CORESET ID may belong only to a single CORESET group.

In 510, the gNB indicates the CORESET group to the UE via a MAC CE. In a first option, the CORESET group ID may be indicated directly in the existing MAC-CE 400. In a second option, a single CORESET ID may be indicated in the MAC-CE 400, and the group to which the indicated CORESET ID belongs will be configured with the TCI state indicated in the MAC-CE 400. In this option, each CORESET ID belongs only to a single CORESET group.

In a third option, a single bit of the MAC-CE 400 may be repurposed to indicate whether the TCI update applies to a group of CORESETs or to a single CORESET. The MAC CE 400 discussed above comprises 7 bits for the TCI state ID. However, because the maximum number of TCI states configurable for the PDCCH is 64, only 6 bits are needed to indicate the TCI state ID. The MAC CE 400 includes 7 bits for the TCI state ID merely so that the rows of the MAC CE 400 are octet-aligned. Thus, by truncating one of the bits from the TCI state ID, the MAC-CE 400 may be modified into the MAC CE 450 described below to include an additional field "C" that indicates whether the TCI update applies to a CORESET group or to a single CORESET.

Figure 4B:
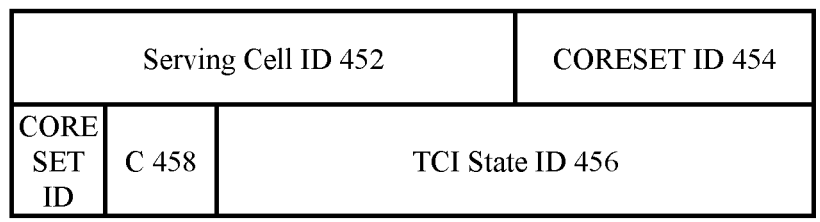
FIG. 4b shows a MAC CE for configuring a Physical Downlink Control Channel (PDCCH) TCI including a field for indicating whether the MAC CE is directed to a TCI update of a group of Core Resource Sets (CORESETs) or of a single CORESET according to various exemplary embodiments.

FIG. 4b shows a MAC CE 450 for configuring a PDCCH TCI including a field 458 for indicating whether the MAC CE is directed to a TCI update of a group of CORESETs or of a single CORESET. The MAC-CE 450, similar to the MAC-CE 400, includes a field 452 for indicating a serving cell ID (5 bits) and a field 454 for indicating a control resource set (CORESET) ID (4 bits). The field 456 for indicating a TCI state ID, in this embodiment, comprises 6 bits, and the field 458 for indicating the nature of the TCI configuration ("C") is a single bit. For example, if C=1, the TCI update applies to a CORESET group and the CORESET ID field 454 comprises the ID of the CORESET group. If C=0, the TCI update applies to a single CORESET and the CORESET ID field 454 applies to the single CORESET.

Single MAC-CE CONFIGURES Multiple CCs

Figure 6A:
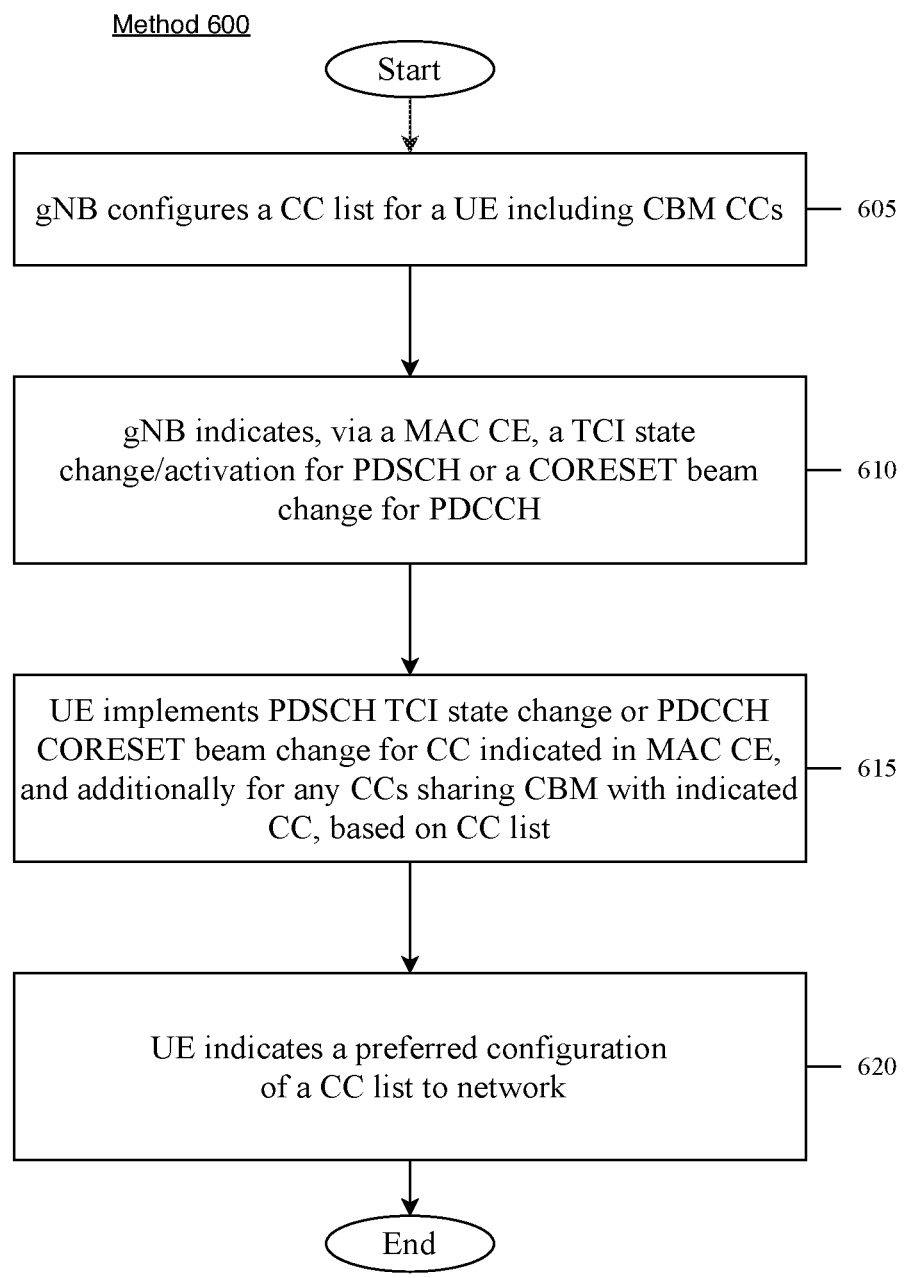
FIG. 6a shows a method for configuring a TCI state for a list of component carriers (CCs) having common beam management (CBM) according to according to various exemplary embodiments.

FIG. 6a shows a method 600 for configuring a TCI state for a list of component carriers (CCs) having common beam management (CBM) according to various exemplary embodiments. CBM treatment for a set of CCs involves using only one beam across all of the CBM CCs. Thus, a same TCI state configuration may be used across all of the CBM CCs. This functionality applies to all intra-band CA cases and is typically used for inter-band CA within a similar frequency range, for example, low-low, mid-mid or high-high band combinations. Independent Beam Management treatment is typically used for inter-band CA within different frequency ranges, for example a low-mid band combination.

In 605, a gNB configures a CC list for a UE including CBM CCs, e.g., CCs using a common beam. In a first option, the CC list is configured comprising all the CCs for which the UE can perform CBM. However, in another embodiment to be described below, the network may make a mistake in configuring the CC list by e.g. failing to include one of the CBM CCs.

In 610, the gNB indicates, via a MAC CE, a TCI state change/activation for PDSCH or a CORESET beam change for the PDCCH. The MAC CE may be the PDCCH MAC CE 400 or the PDSCH MAC CE 750 (described in detail below with regard to FIG. 7b), which also includes the serving cell ID field for indicating a CC. In 615, the UE implements the PDSCH TCI state change or the PDCCH CORESET beam change for the CC indicated in the MAC CE, and additionally for any CCs sharing CBM with the indicated CC, based on the CC list. If the UE has knowledge of a CBM CC that is not included on the list, then the UE may implement the change for the missing CC.

Figure 6B:
FIG. 6b shows a bitmap included in the uplink (UL) MAC CE comprising 32 fields Ci for indicating a preferred configuration of a CC list to the network according to various exemplary embodiments.

In 620, the UE may indicate a preferred configuration of a CC list to the network. The UE may have knowledge of which CCs share the CBM and may indicate the configuration in an uplink (UL) MAC CE. FIG. 6b shows a bitmap 650 included in the UL MAC CE comprising 32 fields Ci for indicating a preferred configuration of a CC list to the network. Currently, NR allows up to 32 CCs to be configured in a carrier aggregation configuration. Each of the fields Ci in the bitmap 650 corresponds to a serving cell ID "i" for a CC, i=0, 1, 2, . . . 30, 31. When Ci=0, the serving cell "i" belongs to the CC list 0, and when Ci=1, the serving cell "i" belongs to the CC list 1. Thus, by indicating a bit for each serving cell, the UE indicates two CC lists to the network. As stated previously, this step may be particularly suitable for scenarios where the network may make a mistake in configuring a CC list. For example, the network may configure 4 CCs, yet configure the CC list with only 3 CCs. Rather than solving this discrepancy at the network side, the UE provides a CC list to the network that groups the CCs more appropriately.

The bitmap 650 may extend each bit field so that each Ci contains 2 bits, in case more than two CC lists are to be indicated. In the extended bitmap, four CC lists may be indicated. The UE may request to update the preferred CC list via a scheduling request (SR) or an existing Physical Uplink Shared Channel (PUSCH) grant.

Single MAC-CE Configures PDCCH and PDSCH

Figure 7A:
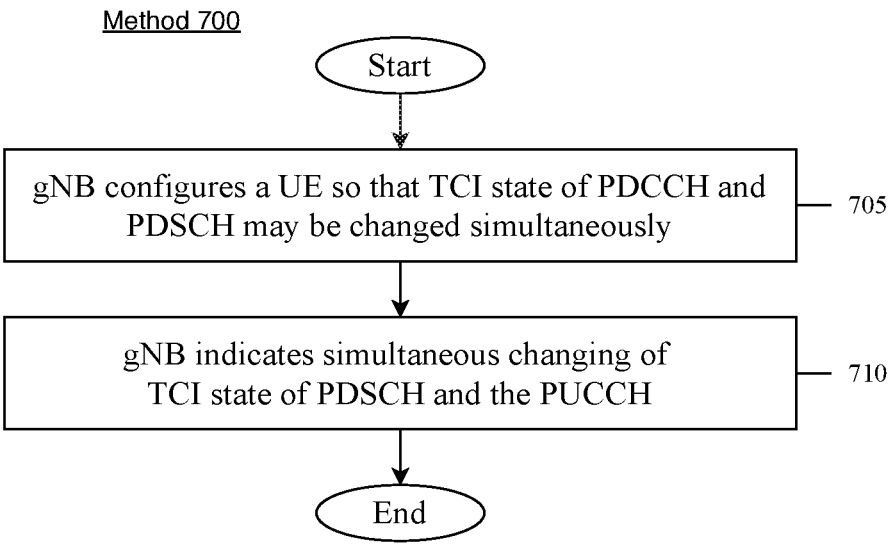
FIG. 7a shows a method for configuring a TCI state for downlink channels including both the Physical Downlink Shared Channel (PDSCH) and the PDDCH using a single MAC CE according to according to various exemplary embodiments.

FIG. 7a shows a method 700 for configuring a TCI state for downlink channels including both the PDSCH and the PDDCH using a single MAC CE according to various exemplary embodiments. In some embodiments, only a single active TCI may be supported for DL including both control (PDCCH) and data (PDSCH). The network, the UE, or both the network and the UE may be so limited. In such a situation, to preserve network overhead and latency, both the PDCCH and the PDSCH beam may be changed by a single MAC CE.

In 705, a gNB configures a UE so that the TCI state of the PDCCH and the PDSCH may be changed simultaneously. In a first option, similar to the third option for the first exemplary embodiment discussed above, a single bit of the existing PDCCH MAC-CE 400 is repurposed so that a new region comprising a single bit is configured in the MAC CE 450. In this first option, the new region (corresponding to region 458 ("C") of the MAC CE 450) is used to indicate a configuration mode, e.g., whether the TCI of the PDSCH and the PDCCH are to be changed simultaneously or whether the TCI of only the PDCCH is to be changed. For example, when C=1, the TCI may change the two channels simultaneously. When C=0, the TCI of only the PDCCH is changed. Alternatively, the two modes may be semi-statically configured by the RRC and the MAC CE 400 may be used.

Figure 7B:
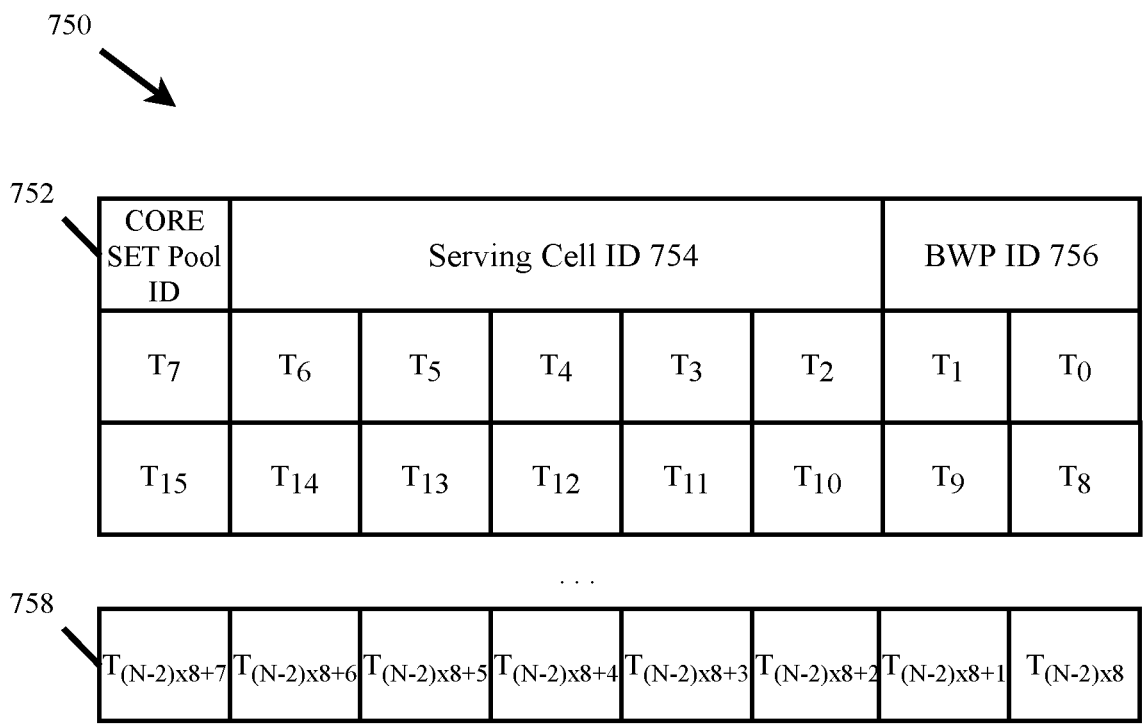
FIG. 7b shows a PDSCH MAC CE for TCI activation according to various exemplary embodiments.

In a second option, a PDSCH TCI activation MAC CE may be used and the RRC may configure one of the two modes. FIG. 7b shows a PDSCH MAC CE 750 for TCI activation. The PDSCH MAC CE 750 includes a field 752 for a CORESET pool index (1 bit), a field 754 for a serving cell ID (5 bits), a field 756 for a bandwidth part (BWP) ID (2 bits), and N fields 758 for a PDSCH TCI state (Ti), each being 1 bit, where the TCI state mapped to the position of the bit is activated/deactivated based on the value of the bit). Similar to above, the two modes may be semi-statically configured by the RRC. The PDSCH MAC CE 750 applies to all the CORESETs configured with the same CORESET-PoolIndex.

In a third option, the PDSCH MAC CE 750 may be modified. FIG. 7c shows a PDSCH MAC CE 760 for TCI activation that is modified to include, in addition to the CORESET Pool ID field 762, the serving cell ID field 764, the BWP ID 766 and the N fields 758 for TCI state, field 770 for a CORESET ID, field 772 "C1" for toggling between activating all CORESETs within a CORESET group or only the CORESET indicated by the CORESET ID, and field 774 "C0" for toggling between activating the PDSCH only, or the PDCCH and the PDSCH simultaneously. The fields "R" are reserved bits.

In 710, the gNB indicates the simultaneous changing of the TCI state of the PDSCH and the PDCCH. If the first option discussed above is used (i.e., the modified PDCCH MAC CE 450 is used), then the C field 458 may be indicated as "1" to change the TCI of the PDSCH and the PDCCH simultaneously. Alternatively, if the unmodified PDCCH MAC CE 400 is used, the RRC may configure the simultaneous TCI state change. If the second option discussed above is used (e.g., the unmodified PDSCH MAC CE 750 is used), then the RRC may configure the simultaneous TCI state change. When the simultaneous change is configured, only one of the Ti fields 758 is allowed to be indicated as "1." If the third option discussed above is used (e.g., the modified PDSCH MAC CE 760 is used), then the C0 field 764 indicates the simultaneous changing. In this modified PDSCH MAC CE 760, up to 8 Ti are allowed to be indicated as one.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A user equipment (UE), comprising:
one or more processors configured to:
receive, from a base station via radio resource control (RRC) signaling, an identification of a group of control resource sets (CORESETs), the CORESET group including a plurality of CORESETs, wherein the CORESET groups comprise a number of CORESET groups (N), and wherein a CORESET belongs to more than one of the N CORESET groups;
receive, from the base station, an indication, via a medium access control (MAC) control element (CE), of a transmission configuration indicator (TCI) state change for one or more of the plurality of CORESETs in the CORESET group; and
apply the TCI state change for the one or more of the plurality of CORESETs in the CORESET group based on, at least, the indication; and
a transceiver communicatively connected to the one or more processors.

2. The UE of claim 1, wherein the N number of CORESET groups comprise a different set of CORESETs.

3. The UE of claim 1, wherein the MAC CE comprises a CORESET group identifier (ID) for the CORESET group and wherein the TCI state change is applied to all the CORESETs in the CORESET group corresponding to the CORESET group ID.

4. The UE of claim 1, wherein the MAC CE comprises an identification of one of the plurality of CORESETs in the CORESET group and the TCI state change is applied to all the CORESETs in the CORESET group to which the one of the CORESETs belongs.

5. The UE of claim 1, wherein the MAC CE comprises a field for indicating whether the TCI state change applies to a single CORESET or to the CORESET group.

6. The UE of claim 5, wherein, when the field indicates the TCI state change applies to the CORESET group, a further field of the MAC CE comprises a CORESET group identifier (ID) for the CORESET group.

7. The UE of claim 5, wherein, when the field indicates the TCI state change applies to a single CORESET, a further field of the MAC CE comprises a CORESET identifier (ID) for the single CORESET.

8. The UE of claim 5, wherein the field for indicating whether the TCI state change applies to a single CORESET or to the CORESET group is a single bit.

9. The UE of claim 1, wherein each CORESET group is configured with a same number of CORESET IDS.

10. The UE of claim 1, wherein each CORESET group is configured with a different number of CORESET IDS.

11. A processor of a user equipment (UE) configured to perform operations comprising:
receive, from a base station via radio resource control (RRC) signaling, an identification of a group of control resource sets (CORESETs), the CORESET group including a plurality of CORESETs, wherein the CORESET groups comprise a number of CORESET groups (N), and wherein a CORESET belongs to more than one of the N CORESET groups;
receive, from the base station, an indication, via a medium access control (MAC) control element (CE), of a transmission configuration indicator (TCI) state change for one or more of the plurality of CORESETs in the CORESET group; and
apply the TCI state change for the one or more of the plurality of CORESETs in the CORESET group based on, at least, the indication.

12. The processor of claim 11, wherein the N number of CORESET groups comprise a different set of CORESETs.

13. The processor claim 11, wherein the MAC CE comprises a CORESET group identifier (ID) for the CORESET group and wherein the TCI state change is applied to all the CORESETs in the CORESET group corresponding to the CORESET group ID.

14. The processor of claim 11, wherein the MAC CE comprises an identification of one of the plurality of CORESETs in the CORESET group and the TCI state change is applied to all the CORESETs in the CORESET group to which the one of the CORESETs belongs.

15. The processor of claim 11, wherein the MAC CE comprises a field for indicating whether the TCI state change applies to a single CORESET or to the CORESET group.

16. The processor of claim 15, wherein, when the field indicates the TCI state change applies to the CORESET group, a further field of the MAC CE comprises a CORESET group identifier (ID) for the CORESET group.

17. The processor of claim 15, wherein, when the field indicates the TCI state change applies to a single CORESET, a further field of the MAC CE comprises a CORESET identifier (ID) for the single CORESET.

18. The processor of claim 15, wherein the field for indicating whether the TCI state change applies to a single CORESET or to the CORESET group is a single bit.

19. The processor of claim 11, wherein each CORESET group is configured with a same number of CORESET IDS.

20. The processor of claim 11, wherein each CORESET group is configured with a different number of CORESET IDS.

* * * * *